US012809165B2

(12) United States Patent
Yoshikaie

(10) Patent No.: US 12,809,165 B2
(45) Date of Patent: Nov. 24, 2026

(54) IMAGE DISPLAY DEVICE, LIGHT GUIDE PLATE, AND IMAGE DISPLAY METHOD

(71) Applicant: SONY GROUP CORPORATION, Tokyo (JP)

(72) Inventor: Akira Yoshikaie, Tokyo (JP)

(73) Assignee: Sony Group Corporation, Tokyo (JP)

( * ) Notice: Subject to any disclaimer, the term of this patent is extended or adjusted under 35 U.S.C. 154(b) by 219 days.

(21) Appl. No.: 18/718,720

(22) PCT Filed: Nov. 16, 2022

(86) PCT No.: PCT/JP2022/042499

§ 371 (c)(1),
(2) Date: Jun. 11, 2024

(87) PCT Pub. No.: WO2023/119962

PCT Pub. Date: Jun. 29, 2023

(65) Prior Publication Data

US 2025/0044586 A1 Feb. 6, 2025

(30) Foreign Application Priority Data

Dec. 20, 2021 (JP) ................................ 2021-205842

(51) Int. Cl.
*G02B 27/00* (2006.01)
*G02B 27/01* (2006.01)
*G02B 27/28* (2006.01)

(52) U.S. Cl.
CPC ..... *G02B 27/0093* (2013.01); *G02B 27/0172* (2013.01); *G02B 27/283* (2013.01); *G02B 2027/0116* (2013.01)

(58) Field of Classification Search
CPC ............ G02B 27/0093; G02B 27/0172; G02B 27/283
See application file for complete search history.

(56) References Cited

U.S. PATENT DOCUMENTS

2013/0322810 A1 12/2013 Robbins
2015/0168731 A1 6/2015 Robbins
(Continued)

FOREIGN PATENT DOCUMENTS

JP 2002-303819 10/2002
JP 2004-157173 6/2004
(Continued)

OTHER PUBLICATIONS

JP 2007011057 machine translation (Year: 2007).*
(Continued)

*Primary Examiner* — James A Dudek
(74) *Attorney, Agent, or Firm* — SHERIDAN ROSS P.C.

(57) ABSTRACT

It is a principal object of the present invention to prevent multiple focus points from being projected to the pupil at the same time. The present invention provides an image display device including an image formation unit, a light guide plate that emits image light entering from the image formation unit, to a pupil of an observer, a detection unit that detects a position of the pupil, and a control unit that controls the image formation unit. The light guide plate has at least two paths that perform internal total reflection and guidance of the image light entering therein. Each of the paths includes at least one deflection portion that forms a focus point at the pupil. The control unit makes a selection from the deflection portions on the basis of position information of the pupil.

20 Claims, 11 Drawing Sheets

(56) References Cited

U.S. PATENT DOCUMENTS

| | | | |
|---|---|---|---|
| 2018/0364482 | A1 | 12/2018 | Georgiou et al. |
| 2020/0152105 | A1 | 5/2020 | Ishii |
| 2021/0199958 | A1 | 7/2021 | Huang et al. |

FOREIGN PATENT DOCUMENTS

| | | |
|---|---|---|
| JP | 2007-011057 | 1/2007 |
| WO | WO 2005/093493 | 10/2005 |
| WO | WO 2018/122902 | 7/2018 |
| WO | WO 2021/220638 | 11/2021 |

OTHER PUBLICATIONS

English Translation of International Search Report prepared by the Japan Patent Office on Dec. 9, 2022, for International Application No. PCT/JP2022/042499, 3 pgs.

* cited by examiner

FIG. 5
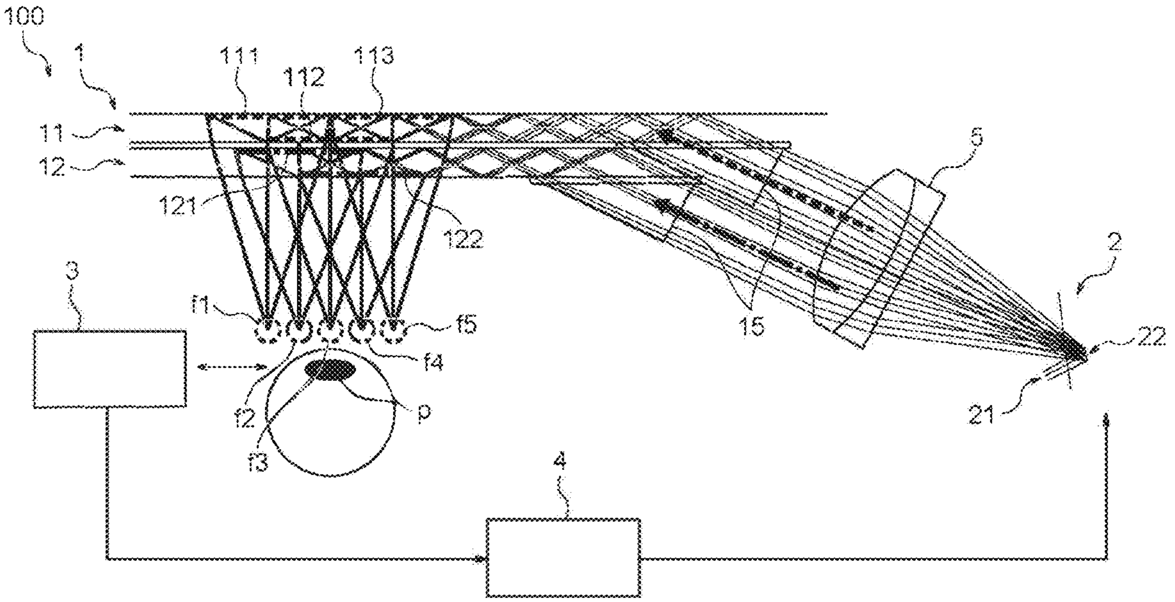
FIG. 6A
FIG. 6B
FIG. 6C
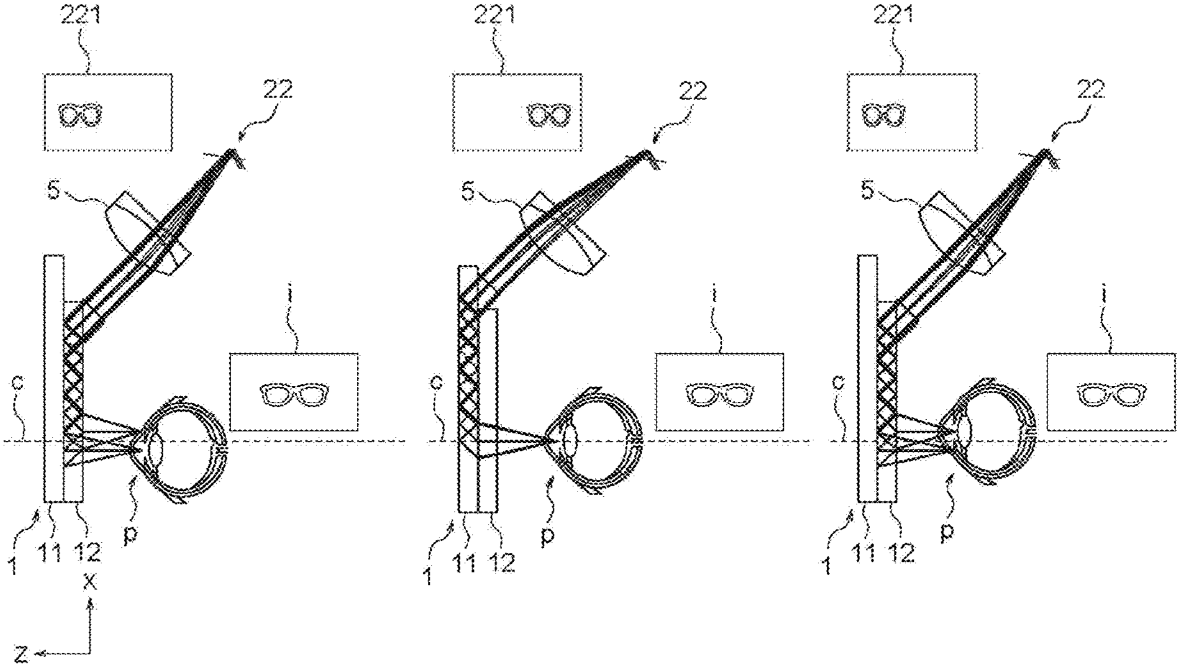

IMAGE DISPLAY DEVICE, LIGHT GUIDE PLATE, AND IMAGE DISPLAY METHOD

CROSS REFERENCE TO RELATED APPLICATIONS

This application is a national stage application under 35 U.S.C. 371 and claims the benefit of PCT Application No. PCT/JP2022/042499, having an international filing date of 16 Nov. 2022, which designated the United States, which PCT application claimed the benefit of Japanese Patent Application No. 2021-205842, filed 20 Dec. 2021, the entire disclosures of each of which are incorporated herein by reference.

TECHNICAL FIELD

The present technology relates to an image display device, a light guide plate, and an image display method.

BACKGROUND ART

Conventionally, in order to implement cross reality (XR) including virtual reality (VR), augmented reality (AR), mixed reality (MR), and so forth, an image display device that projects image light to the retinas of an observer has been developed.

For example, PTL 1 discloses “an optical device comprising a light guide plate that performs internal total reflection and guidance of parallel light flux groups that satisfy an internal total reflection condition, a first reflection type volume hologram grating that diffracts and reflects parallel light flux groups entering the light guide plate from outside and having traveling directions different from each other such that the internal total reflection condition of the light guide plate is satisfied while the parallel light flux groups remain as they are, and a second reflection type volume hologram grating that diffracts and reflects the parallel light flux groups having undergone the internal total reflection and guidance by the light guide plate such that the parallel light flux groups depart from the internal total reflection condition of the light guide plate, the second reflection type volume hologram grating causing the resulting parallel light flux groups to be emitted from the light guide plate while the parallel light flux groups remain as they are, wherein some parallel light fluxes of the parallel light flux groups having undergone the internal total reflection and guidance by the light guide plate are different from each other in number of times of total reflection during a period since the parallel light flux groups enter the light guide plate from outside until the parallel light flux groups are emitted from the light guide plate.”

For example, PTL 2 discloses “an optical device in which multiple light guide plates configured to emit parallel light flux groups having traveling directions different from each other after the parallel light flux groups enter the light guide plates and propagate through total reflection inside the light guide plates are stacked through a medium having a refractive index lower than that of the light guide plates, wherein each of the multiple light guide plates includes a first reflection type volume hologram grating that diffracts and reflects the parallel light flux groups within an entering region of the parallel light flux groups such that the parallel light flux groups satisfy an internal total reflection condition inside the light guide plate while the parallel light flux groups remain as they are, and a second reflection type volume hologram grating that diffracts and reflects the parallel light flux groups within an emitting region of the parallel light flux groups such that the parallel light flux groups are emitted from the light guide plate while the parallel light flux groups remain as they are, and, among the first reflection type volume hologram gratings and the second reflection type volume hologram gratings of the multiple light guide plates, at least all of the first reflection type volume hologram gratings exist on a same optical path, the first reflection type volume hologram gratings of the multiple light guide plates sequentially diffract some of the parallel light groups, and at least some of those parallel light flux groups which propagate from the entering regions to the emitting regions in the multiple light guide plates while repeating total reflection and which have traveling directions different from each other are different from each other in number of times of total reflection depending upon the difference in traveling direction.”

For example, PTL 3 discloses “a wide viewing zone retinal projection type display system in which an optical system is configured such that a liquid crystal display is irradiated from multiple point light sources and light transmitted through the liquid crystal display forms a convergence point at multiple positions at predetermined intervals within a movable range of the pupil.”

CITATION LIST

Patent Literature

PTL 1: PCT Patent Publication No. WO2005/093493
PTL 2: Japanese Patent Laid-open No. 2007-11057
PTL 3: Japanese Patent Laid-open No. 2004-157173

SUMMARY

Technical Problem

However, in the technologies disclosed in PTL 1 to PTL 3, it sometimes occurs that multiple focus points are projected to the pupil at the same time or an image cannot be observed, depending upon a pupil diameter or a pupil position. A problem arises that, if multiple focus points are projected to the pupil at the same time, a deep focal depth cannot be achieved. As a result, a problem arises that an observer cannot observe a clear image.

Therefore, it is a principal object of the present technology to provide an image display device, a light guide plate, and an image display method that prevent multiple focus points from being projected to the pupil at the same time.

Solution to Problem

The present technology provides an image display device including an image formation unit, a light guide plate that emits image light entering from the image formation unit, to a pupil of an observer, a detection unit that detects a position of the pupil, and a control unit that controls the image formation unit. The light guide plate has at least two paths that perform internal total reflection and guidance of the image light entering therein, each of the paths includes at least one deflection portion that forms a focus point at the pupil, and the control unit makes a selection from the deflection portions on the basis of position information of the pupil.

The image formation unit may include a light source and a scanning unit that performs scanning with light entering from the light source, and the scanning unit may have a scanning region corresponding to the paths.

The deflection portion may include a blue light deflection portion that forms a focus point of blue light, a green light deflection portion that forms a focus point of green light, and a red light deflection portion that forms a focus point of red light, and a distance between the deflection portion and the pupil may be adjusted such that each of the blue light deflection portion, the green light deflection portion, and the red light deflection portion does not emit light of any other color to the pupil.

The deflection portion may include a blue light deflection portion that forms a focus point of blue light, a green light deflection portion that forms a focus point of green light, and a red light deflection portion that forms a focus point of red light, and a distance between the focus points may be adjusted such that each of the blue light deflection portion, the green light deflection portion, and the red light deflection portion does not emit light of any other color to the pupil.

The deflection portion may include a blue light deflection portion that forms a focus point of blue light, a green light deflection portion that forms a focus point of green light, and a red light deflection portion that forms a focus point of red light, and a diffraction characteristic of the deflection portion may be adjusted such that each of the blue light deflection portion, the green light deflection portion, and the red light deflection portion does not emit light of any other color to the pupil.

The image formation unit may include a correction unit that corrects an intermediate image plane with respect to the deflection portion that forms the focus point.

The correction unit may include a zoom lens, a liquid crystal lens, a liquid lens, or a deformable mirror.

The image formation unit may include a chromatic aberration correction unit that corrects chromatic aberration between the focus points.

The chromatic aberration correction unit may include a diffraction grating or a holographic optical element.

The light guide plate may include, at least at a portion thereof between the two paths, a polarized light switching portion that transmits or reflects the image light entering therein, the image formation unit may include a switching controlling unit that performs switching between transmission and reflection to be performed by the polarized light switching portion, and the control unit may select transmission or reflection to be performed by the polarized light switching portion, under control of the switching controlling unit.

The polarized light switching portion may include a polarizing beam splitter.

The light guide plate may include, at least at a portion thereof between the two paths, a polarized light switching portion that transmits or reflects the image light entering therein, the image formation unit may include a correction unit that corrects an intermediate image plane with respect to the deflection portion that forms the focus point, a chromatic aberration correction unit that corrects chromatic aberration between the focus points, and a switching controlling unit that performs switching between transmission and reflection to be performed by the polarized light switching portion, and the control unit may select transmission or reflection to be performed by the polarized light switching portion, under control of the switching controlling unit.

The light guide plate may include, at least at a portion thereof between the two paths, a polarized light switching portion that transmits or reflects the image light entering therein, the image formation unit may include a correction unit that corrects an intermediate image plane with respect to the deflection portion that forms the focus point and a switching controlling unit that performs switching between transmission and reflection to be performed by the polarized light switching portion, and the control unit may select transmission or reflection to be performed by the polarized light switching portion, under control of the switching controlling unit.

The image display device may further include a phase modulation unit provided on an optical axis of image light emitted from the image formation unit.

The deflection portion may be arranged so as to form a focus point along a trajectory drawn by the pupil together with rotation of an eyeball.

The control unit may change a distance between the deflection portion and the pupil on the basis of the position information of the pupil.

The light guide plate may have at least three paths that perform internal total reflection and guidance of the image light entering therein.

The smallest distance between the focus points may be 2 mm.

Further, the present technology provides a light guide plate having at least two paths that perform internal total reflection of image light entering therein and emit the resultant light to a pupil of an observer. Each of the paths has at least one deflection portion that forms a focus point at the pupil, and each of the deflection portions is selected on the basis of position information of the pupil.

Furthermore, the present technology provides an image display method including detecting a position of a pupil of an observer, selecting, on the basis of position information of the pupil, at least one of at least two paths that perform internal total reflection and guidance of image light to be emitted to the pupil, and condensing to the pupil the image light emitted from the selected one of the paths.

With the present technology, it is possible to provide an image display device, a light guide plate, and an image display method that prevent multiple focus points from being projected to the pupil at the same time. It is to be noted that the effect described here is not necessarily restrictive, and any effect described in the present disclosure may be offered.

BRIEF DESCRIPTION OF DRAWINGS

FIG. 5 is a block diagram depicting an example of a configuration of an image display device 100 according to an embodiment of the present technology.

FIGS. 6A, 6B and 6C illustrate simplified diagrams depicting a relation between a scanning region 221 a scanning unit 22 according to an embodiment of the present technology has and an image i an observer views.

DESCRIPTION OF EMBODIMENTS

Figure 1A:
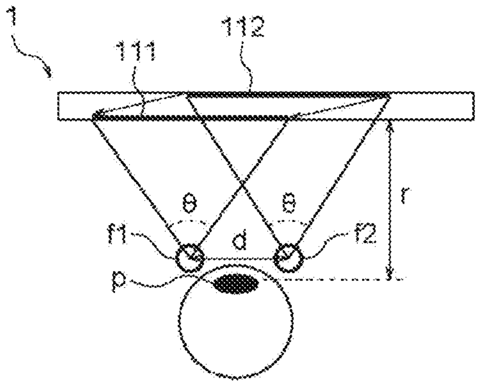
FIG. 1A is a simplified diagram depicting a comparative example of a light guide plate according to an embodiment of the present technology.

In the following, preferred embodiments for carrying out the present technology are described with reference to the drawings. It is to be noted that the embodiments hereinafter described indicate an example of representative embodiments of the present technology, and the scope of the present technology is not restricted by them. Further, the present technology can combine any of working examples and modifications thereof described hereinbelow.

In the following description of the embodiments, a configuration is sometimes described using a term with "substantially" like substantially parallel or substantially orthogonal. For example, "substantially parallel" not only signifies a fully parallel state but also signifies a substantially parallel state, that is, a state displaced, for example, by approximately several percent from a fully parallel state. This similarly applies to other terms with "substantially." Further, the drawings are schematic diagrams and are not always depicted in a rigorous manner.

Unless otherwise specified, in any drawing, "up" signifies an upward direction or the upper side in the figure, "down" signifies a downward direction or the lower side in the figure, "left" signifies a leftward direction or the left side in the figure, and "right" signifies a rightward direction or the right side in the figure. Further, in the drawings, identical or equivalent elements or members are denoted by identical reference signs, and overlapping description of them is omitted.

The description is given in the following order.

1. First Embodiment (Example 1 of Image Display Device)
2. Second Embodiment (Example 2 of Image Display Device)
3. Third Embodiment (Example 3 of Image Display Device)
4. Fourth Embodiment (Example 4 of Image Display Device)
5. Fifth Embodiment (Example 5 of Image Display Device)
6. Sixth Embodiment (Example 6 of Image Display Device)
7. Seventh Embodiment (Example 7 of Image Display Device)
8. Eighth Embodiment (Example 8 of Image Display Device)
9. Ninth Embodiment (Example 9 of Image Display Device)
10. Tenth Embodiment (Example 10 of Image Display Device)
11. Eleventh Embodiment (Example 11 of Image Display Device)
12. Twelfth Embodiment (Example 12 of Image Display Device)
13. Thirteenth Embodiment (Example of Light Guide Plate)
14. Fourteenth Embodiment (Example of Image Display Method)

1. First Embodiment (Example 1 of Image Display Device)

Overview

An image display device according to an embodiment of the present technology projects image light to the pupil of an observer to form a focus point at the pupil. The image display device may possibly be a head-mounted display (HMD) or the like that is mounted on the head of a user. Alternatively, the image display device may be arranged as an infrastructure at a predetermined place.

Figure 1B:
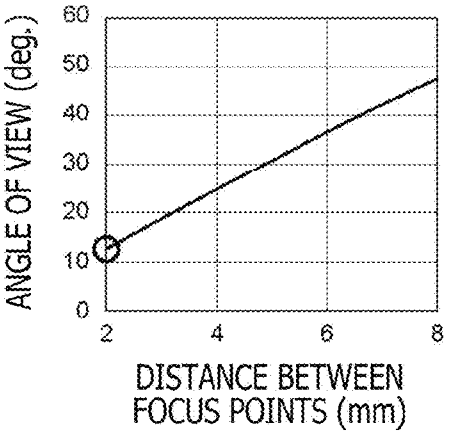
FIG. 1B is a graph depicting a correlation between the distance between focus points and the angle of view.

A situation in which the image display device forms a focus point at the pupil is described with reference to FIGS. 1A and 1B. FIG. 1A is a simplified diagram depicting a comparative example of a light guide plate according to an embodiment of the present technology. FIG. 1B is a graph depicting a correlation between the distance between focus points and the angle of view.

As depicted in FIG. 1A, the light guide plate 1 provided in the image display device has deflection portions 111 and 112. The deflection portion 111 diffracts and reflects image light that is guided inside the light guide plate 1 while undergoing internal total reflection, to form a focus point f1. The deflection portion 112 diffracts and reflects image light that is guided inside the light guide plate 1 while undergoing internal total reflection, to form a focus point f2. The deflection portion 111 and the deflection portion 112 may each be, for example, a holographic optical element (HOE) or a diffraction grating.

Conventionally, the diameter of a focus point is frequently equal to or smaller than approximately 1 mm. Therefore, there is a problem that, if the pupil is displaced from the focus point, an image cannot be viewed. In order to solve this problem, a technology for expanding an eye box has been studied. As an example of this technology, there is a technology which separates image light to form multiple focus points in the proximity of the pupil as depicted in FIG. 1A. The deflection portion 111 and the deflection portion 112 arranged on an upper face of the light guide plate 1 diffract and reflect image light to form the focus point f1 and the focus point f2, respectively.

At this time, image light diffracted and reflected by the deflection portion 112 is sometimes reflected by a lower face of the light guide plate 1 and enters the deflection portion 112 again. In this case, image light that is preferably diffracted and reflected originally by the deflection portion 111 arranged on the lower face of the light guide plate 1 is sometimes diffracted and reflected by the deflection portion 112 arranged on the upper face of the light guide plate 1. This causes a problem of double vision of an image.

In order to solve this problem, it is necessary to appropriately adjust a distance d between focus points and a distance (eye relief) r from the light guide plate 1 to the pupil p. If the distances are adjusted, an angle θ of view is determined. Since it is generally said that the minimum value of the pupil diameter is approximately 2 mm, if the distance d between focus points is designed to 2 mm, the angle θ of view becomes approximately 13 degrees as depicted in FIG. 1B and becomes a considerably small angle of view. Further, if the pupil diameter changes to 2 mm or more, there is the possibility that multiple focus points may be projected to the pupil at the same time. If multiple focus points are projected to the pupil at the same time, a problem arises that a deep focal depth cannot be achieved. As a result, a problem arises that the observer cannot observe a clear image.

Figure 2A:
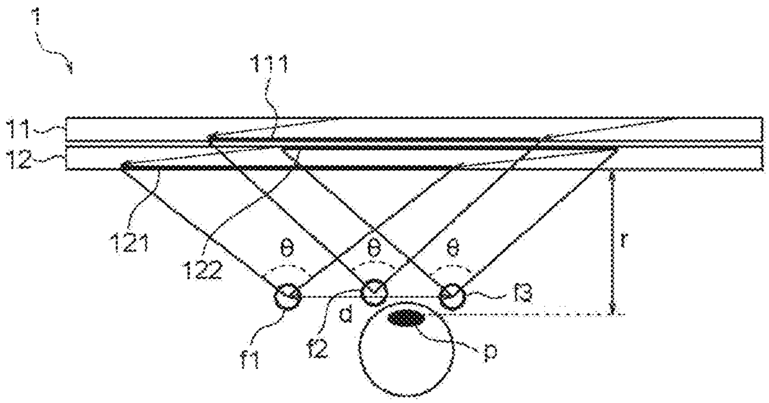
FIG. 2A is a simplified diagram depicting an example of a configuration of a light guide plate according to an embodiment of the present technology.
Figure 2B:
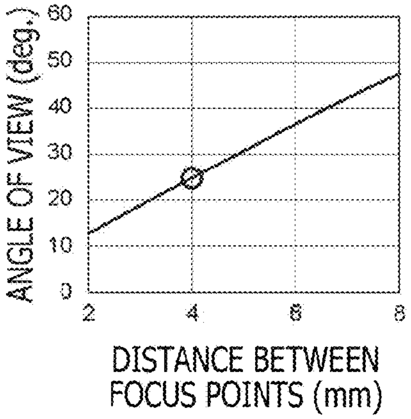
FIG. 2B is a graph depicting a correlation between the distance between focus points and the angle of view.

Therefore, the present technology prevents multiple focus points from being projected to the pupil at the same time. A light guide plate according to an embodiment of the present technology is described with reference to FIGS 2A and 2B. FIG. 2A is a simplified diagram depicting an example of a configuration of a light guide plate according to an embodiment of the present technology. FIG. 2B is a graph depicting a correlation between the distance between focus points and the angle of view.

As depicted in FIG. 2A, the light guide plate 1 has at least two paths 11 and 12 that perform internal total reflection and guidance of image light entering from an image formation unit 2. The two paths 11 and 12 may be formed by using two light guide plates as depicted in FIG. 2A, or the two paths 11 and 12 may be formed by providing a partition in one light guide plate.

Each of the paths 11 and 12 has at least one deflection portion 111, 121, or 122 that forms a focus point at the pupil p. The first path 11 has the deflection portion 111. The second path 12 has the deflection portions 121 and 122. The deflection portion 121 forms a focus point f1, the deflection portion 111 forms a focus point f2, and the deflection portion 122 form a focus point f3.

Consequently, it is made possible, for example, for the deflection portions the second path 12 has to form the focus point f1 and the focus point f3 and for the deflection portion the first path 11 has not to form the focus point f2. Further, the distance d between the focus point f1 and the focus point f3 can be set to 4 mm. As a result, multiple focus points are prevented from being projected to the pupil at the same time.

Further, as depicted in FIG. 2B, where the distance between the focus points is 4 mm, the angle of view is approximately 25 degrees and becomes a wide angle of view. Moreover, for example, the shortest distance between the focus point f1 and the focus point f2 can be set to 2 mm. As a result, the eye box is expanded.

Figure 3A:
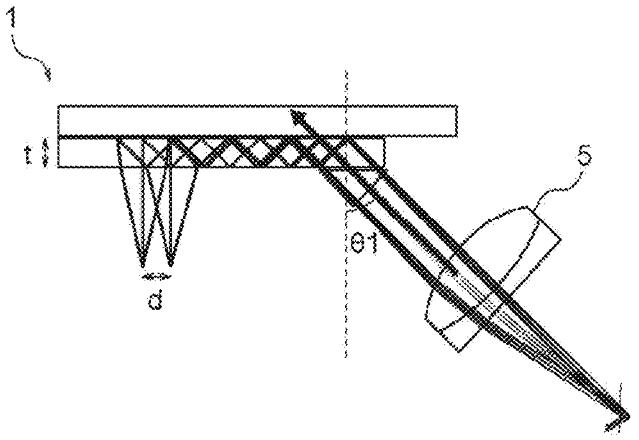
FIG. 3A is a simplified diagram depicting an example of a configuration of a light guide plate according to an embodiment of the present technology.
Figure 3B:
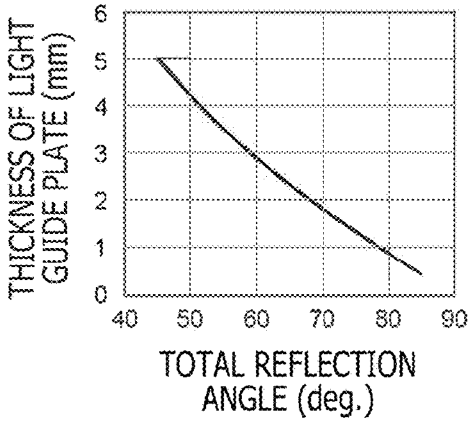
FIG. 3B is a graph depicting a correlation between an angle θ1 at which image light is totally reflected and a thickness t of the light guide plate.

Here, a correlation between the angle with which image light is totally reflected inside the light guide plate and the thickness of the light guide plate is described with reference to FIGS. 3A and 3B. FIG. 3A is a simplified diagram depicting an example of a configuration of a light guide plate according to an embodiment of the present technology. An angle θ1 with which image light is totally reflected and a thickness t of the light guide plate are depicted. FIG. 3B is a graph depicting a correlation between the angle θ1 with which image light is totally reflected and the thickness t of the light guide plate. As depicted in FIG. 3B, the thickness t of the light guide plate indicated on the axis of ordinate decreases as the angle θ1 that is indicated on the axis of abscissa and with which image light is totally reflected increases. That is, where the image display device is to be further reduced in size and weight, it is preferable to increase the angle θ1 with which image light is totally reflected.

Figure 4A:
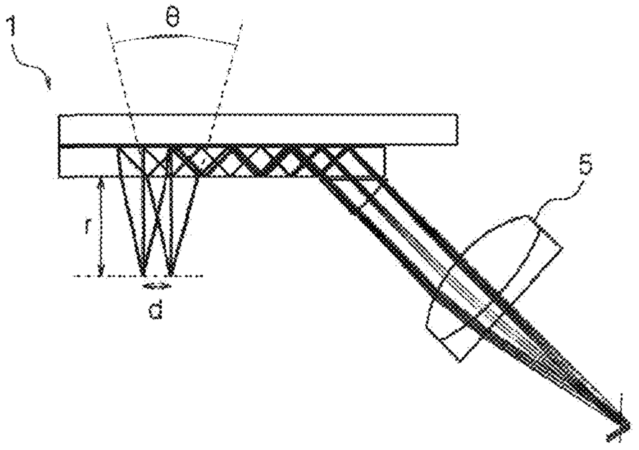
FIG. 4A is a simplified diagram depicting an example of a configuration of a light guide plate according to an embodiment of the present technology. An eye relief r and an angle θ of view are depicted.
Figure 4B:
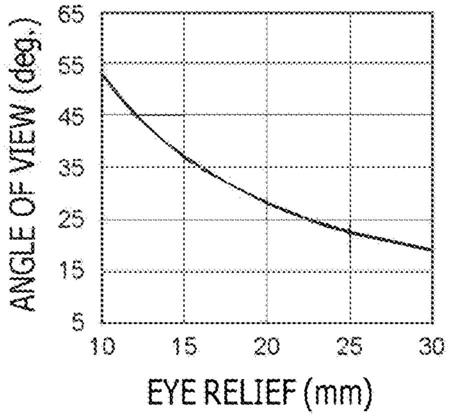
FIG. 4B is a graph depicting a correlation between the eye relief r and the angle θ of view.

Further, a correlation between the eye relief that is the distance from the light guide plate to the focus point and the angle of view is described with reference to FIGS. 4A and 4B. FIG. 4A is a simplified diagram depicting an example of a configuration of a light guide plate according to an embodiment of the present technology. An eye relief r and the angle θ of view are depicted. FIG. 4B is a graph depicting a correlation between the eye relief r and the angle θ of view. As depicted in FIG. 4B, as the eye relief r indicated on the axis of abscissa decreases, the angle θ of view indicated on the axis of ordinate increases. That is, where an image having a wide angle of view is to be provided, it is preferable to reduce the eye relief r.

In the image display device according to an embodiment of the present technology, it is preferable to appropriately design the angle θ1 with which image light is to be totally reflected, the thickness t of the light guide plate, the angle θ of view, and the eye relief r.

(2) Present Embodiment

An image display device according to an embodiment of the present technology includes an image formation unit, a light guide plate that emits image light entering from the image formation unit, to the pupil of an observer, a detection unit that detects the position of the pupil, and a control unit that controls the image formation unit. The light guide plate has at least two paths that perform internal total reflection and guidance of the image light entering therein, each of the paths having at least one deflection portion that forms a focus point in the pupil, and the control unit makes a selection from the deflection portions on the basis of position information of the pupil.

The image display device according to an embodiment of the present technology is described with reference to FIG. 5. FIG. 5 is a block diagram depicting an example of a configuration of an image display device 100 according to an embodiment of the present technology. As depicted in FIG. 5, the image display device 100 according to the embodiment of the present technology includes an image formation unit 2, a light guide plate 1 that emits image light entering from the image formation unit 2, to the pupil p of an observer, a detection unit 3 that detects the position of the pupil p, and a control unit 4 that controls the image formation unit 2.

The image formation unit 2 forms image light. The image formation unit 2 can be implemented, for example, by use of a laser scan display, a micro wallet, or the like. The image formation unit 2 includes a light source 21 and a scanning unit 22 that scans with light entering from the light source 21. The light source 21 can be implemented, for example, by use of an LED (Light Emitting Diode), an LD (Laser Diode), or the like. The scanning unit 22 can be implemented, for example, by use of a MEMS mirror or the like.

Image light emitted from the image formation unit 2 is condensed by a projection lens 5 and enters the light guide plate 1 from an entering portion 15 the light guide plate 1 has.

The light guide plate 1 has at least two paths 11 and 12 that perform internal total reflection and guidance of the image light entering from the image formation unit 2. Each of the paths 11 and 12 has at least one deflection portion that forms a focus point at the pupil p.

A deflection portion 111 the first path 11 has forms a focus point f1. Another deflection portion 112 the first path 11 has forms a focus point f3. A further deflection portion 113 the first path 11 has forms a focus point f5.

A deflection portion 121 the second path 12 has forms a focus point f2. Another deflection portion 122 the second path 12 has forms a focus point f4.

The detection unit 3 that detects the position of the pupil p can be implemented using a known technology. For example, it is possible to use a technology that compulsorily changes the luminance of light to be used for irradiation of the eyeball to acquire position information relating to the pupil p.

The control unit 4 selects the first path 11 or the second path 12 on the basis of the position information of the pupil p detected by the detection unit 3. As a result, a deflection portion that is to form a focus point is selected. Since the paths that form the adjacent focus point f1 and focus point f2 are different from each other, multiple focus points can be prevented from being projected to the pupil at the same time. The control unit 4 can be implemented, for example, by a CPU (Central Processing Unit) reading a program.

Here, contrast between the related-art technologies and the present technology is described in more detail. In the technologies disclosed in PTL 1 and PTL 2, light enters the light guide plate at various angles. The reflection type volume hologram grating diffracts and reflects the light at various angles. The diffracted and reflected rays of light having the various angles are guided while undergoing total integral reflection inside the light guide plate and are projected to the pupil of the observer by the reflection type volume hologram grating. At this time, since the rays of light are projected at various angles, there is the possibility that the focus points may not be arranged in a uniformly lined up state, resulting in occurrence of color unevenness or luminance unevenness in the image.

On the other hand, according to the present technology, by appropriately designing the deflection portions, it is possible to arrange focus points in a uniformly lined up relation. This makes it possible for the image display device 100 according to the embodiment of the present technology to provide a free-focus image in which color unevenness or luminance unevenness is less likely to occur.

In the technology disclosed in PTL 3, it is insisted that a light source and a focus point correspond to each other and any focus point can be formed. However, in order to increase the number of focus points, it is necessary to increase also the number of light sources, and there is a problem that the device is likely to have an increased size. Further, a pinhole is arranged in order to eliminate unnecessary stray light. This gives rise to a problem that the size of the device increases.

On the other hand, according to the present technology, one light source can form multiple focus points, and a pinhole for eliminating stray light is not required. This decreases the weight and size of the device and decreases the production cost and the power consumption.

(3) Scanning Region

The scanning unit 22 provided in the image formation unit 2 may have a scanning region corresponding to the paths the light guide plate 1 has. This is described with reference to FIGS. 6A, 6B and 6C. FIGS. 6A, 6B and 6C illustrate simplified diagrams depicting a relation between a scanning region 221 the scanning unit 22 according to the embodiment of the present technology has and an image i the observer views.

A right half region of the scanning region 221 corresponds to the first path 11. A left half region of the scanning region 221 corresponds to the second path 12. A broken line c indicates the center of an eye box.

The lengthwise direction of the light guide plate 1 is determined as an X-axis direction. The thicknesswise direction of the light guide plate 1 is determined as a Z-axis direction.

After the control unit 4 decides whether an image is to be drawn in the left half region of the scanning region 221 or an image is to be drawn in the right half region, the scanning unit 22 draws an image.

As depicted in FIG. 6A, for example, when the position of the pupil p is on the negative side in the X-axis direction with respect to the center c of the eye box, the control unit 4 selects a deflection portion the second path 12 has. The scanning unit 22 draws an image in the left half region corresponding to the second path 12. Image light emitted through the scanning unit 22 is totally reflected inside the second path 12 and introduced to the pupil p.

As depicted in FIG. 6B, for example, when the position of the pupil p is at the center c of the eye box, the control unit 4 selects a deflection portion the first path 11 has. The scanning unit 22 draws an image in the right half region corresponding to the first path 11. Image light emitted through the scanning unit 22 is totally reflected inside the first path 11 and introduced to the pupil p.

As depicted in FIG. 6C, for example, when the position of the pupil p is on the positive side in the X-axis direction with respect to the center c of the eye box, the control unit 4 selects a deflection portion the second path 12 has. The scanning unit 22 draws an image in the left half region corresponding to the second path 12. Image light emitted through the scanning unit 22 is totally reflected inside the second path 12 and introduced to the pupil p.

In each of the cases of FIGS. 6A to 6C, the scanning region 221 changes depending upon the position of the pupil p, but the image i the observer views does not change. The image display device can provide the same image without being influenced by the position of the pupil.

Unless there is a particular technical contradiction, contents of the description given above of the image display device according to the first embodiment of the present technology can be applied to any other embodiment of the present technology.

2. Second Embodiment (Example 2 of Image Display Device)

White light includes blue light, green light, and red light therein. In order to diffract and reflect each of blue light, green light, and red light, the deflection portion includes a blue light deflection portion that forms a focus point of blue light, a green light deflection portion that forms a focus point of green light, and a red light deflection portion that forms a focus point of red light. The blue light deflection portion, the green light deflection portion, and the red light deflection portion may be stacked on each other or may be formed in multi layers in the same layer.

Figure 7:
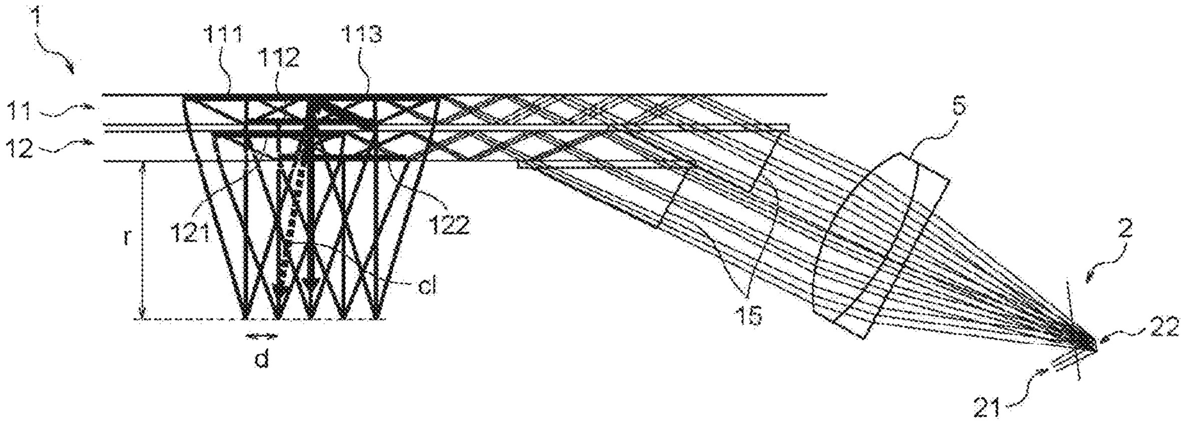
FIG. 7 is a simplified diagram depicting a comparative example of an image display device 100 according to an embodiment of the present technology.

For example, the blue light deflection portion diffracts and reflects blue light introduced thereto through total reflection inside the path to form a focus point. At this time, for example, the green light deflection portion formed in the neighborhood of the blue light deflection portion sometimes diffracts and reflects the blue light. This is described with reference to FIG. 7. FIG. 7 is a simplified diagram depicting a comparative example of the image display device 100 according to an embodiment of the present technology. As depicted in FIG. 7, the green light deflection portion the deflection portion 113 includes diffracts and reflects blue light, thereby producing crosstalk light cl. As a result, a problem arises that the picture quality decreases.

In order to solve this problem, it is preferable that the distance between the deflection portion and the pupil (eye relief r) be adjusted such that each of the blue light deflection portion, the green light deflection portion, and the red light deflection portion does not emit light of any other color to the pupil.

Alternatively, it is preferable that the distance d between focus points be adjusted such that each of the blue light deflection portion, the green light deflection portion, and the red light deflection portion does not emit light of any other color to the pupil.

Figure 8A:
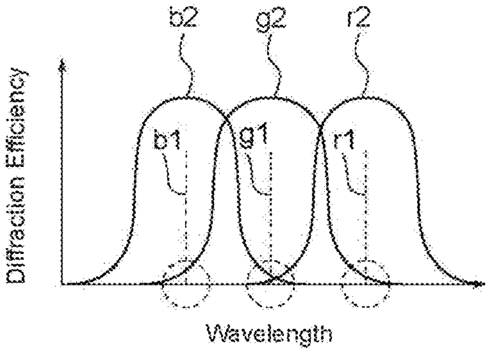
FIGS. 8A, and 8B illustrate graphs depicting diffraction characteristics of deflection portions according to an embodiment of the present technology.
Figure 8B:
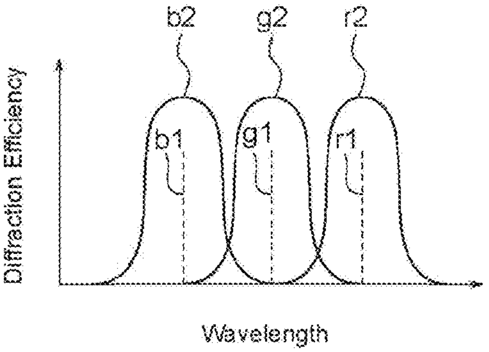

Further, it is preferable that diffraction characteristics of the deflection portions be adjusted such that each of the blue light deflection portion, the green light deflection portion, and the red light deflection portion does not emit light of any other color to the pupil. This is described with reference to FIGS. 8A and 8B. FIGS. 8A and 8B illustrate graphs depicting diffraction characteristics of deflection portions according to an embodiment of the present technology. FIG. 8A is a graph before adjustment, and FIG. 8B is a graph after adjustment.

The axis of abscissa indicates the wavelength, and the axis of ordinate indicates the diffraction efficiency. A characteristic value b1 of blue light emitted from the light source 21, a characteristic value g1 of green light emitted from the light source 21, and a characteristic value r1 of red light emitted from the light source 21 are depicted. Further, a characteristic value b2 of blue light diffracted and reflected by the blue light deflection portion, a characteristic value g2 of green light diffracted and reflected by the green light deflection portion, and a characteristic value r2 of red light diffracted and reflected by the red color deflection portion are depicted.

As depicted in FIG. 8A, the characteristic value b1 of blue light emitted from the light source 21 overlaps the characteristic value g2 of green light diffracted and reflected by the green light deflection portion. Similarly, the characteristic value g1 of green light emitted from the light source 21 overlaps the characteristic value b2 of blue light diffracted and reflected by the blue light deflection portion and the characteristic value r2 of red light diffracted and reflected by the red light deflection portion. The characteristic value r1 of red light emitted from the light source 21 overlaps the characteristic value g2 of green light diffracted and reflected by the green light deflection portion. Consequently, crosstalk light cl is produced. As a result, a problem occurs that the picture quality decreases.

In order to solve this problem, it is preferable to adjust the diffraction characteristics of the deflection portions such that each of the blue light deflection portion, the green light deflection portion, and the red light deflection portion does not diffract or reflect light of any other color. As depicted in FIG. 8B after adjustment, the characteristic value b1 of blue light emitted from the light source 21 does not overlap the characteristic value g2 of green light diffracted and reflected by the green light deflection portion. Similarly, the characteristic value g1 of green light emitted from the light source 21 does not overlap any of the characteristic value b2 of blue light diffracted and reflected by the blue light deflection portion and the characteristic value r2 of red light diffracted and reflected by the red light deflection portion. The characteristic value r1 of red light emitted from the light source 21 does not overlap the characteristic value g2 of green light diffracted and reflected by the green light deflection portion. Consequently, the crosstalk light cl is reduced. As a result, the image display device can provide an image of high picture quality.

Unless there is a particular technical contradiction, contents of the description given above of the image display device according to the second embodiment of the present technology can be applied to any other embodiment of the present technology.

3. Third Embodiment (Example 3 of Image Display Device)

Figure 9:
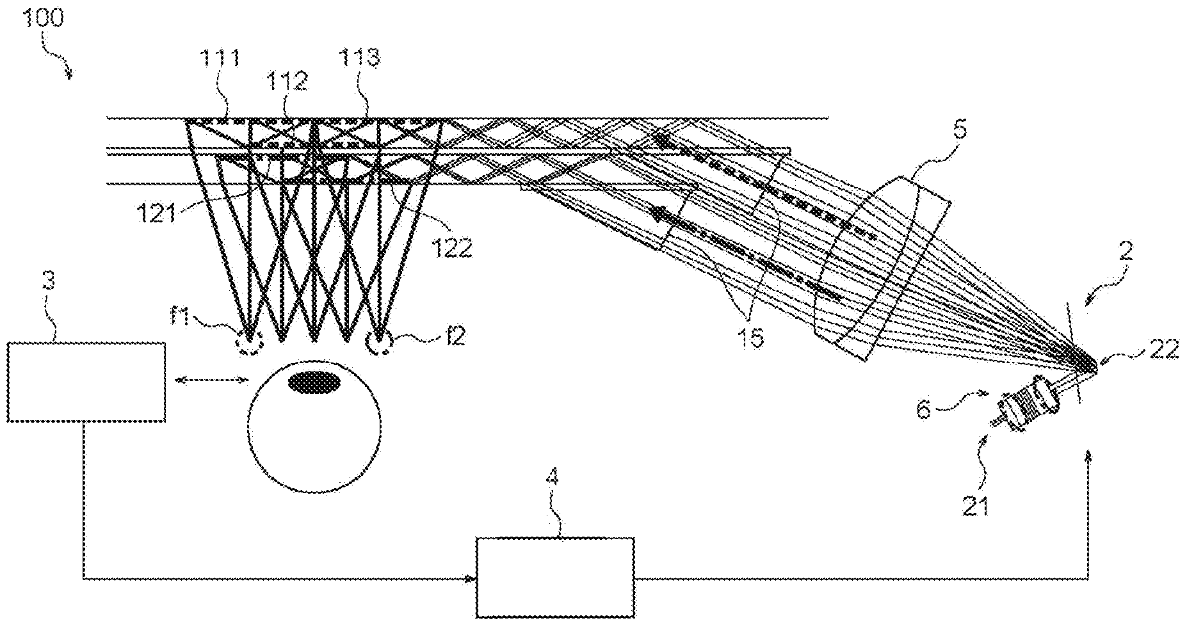
FIG. 9 is a block diagram depicting an example of a configuration of an image display device 100 according to an embodiment of the present technology.

The image formation unit may include a correction unit that corrects an intermediate image plane with respect to a deflection portion that forms a focus point. This is described with reference to FIG. 9. FIG. 9 is a block diagram depicting an example of a configuration of an image display device 100 according to an embodiment of the present technology.

As depicted in FIG. 9, optical path lengths from the light source 21 to the respective focus points are different from each other. This causes a problem that intermediate image planes are displaced with respect to the respective deflection portions. As a result, a problem occurs that the picture quality is decreased. For example, the optical path of image light that forms the focus point f2 is shorter than the optical path of image light that forms the focus point f1. Therefore, although the image at the focus point f1 is displayed clearly, the image at the focus point f2 is sometimes displayed with blurring.

Therefore, the image formation unit 2 according to the embodiment of the present technology includes a correction unit 6 that corrects an intermediate image plane with respect to a deflection portion that forms a focus point. The correction unit 6 corrects optical aberration for each focus point. The control unit 4 controls the state of the correction unit 6. Consequently, the user can always be provided with a clear image.

Figure 10A:
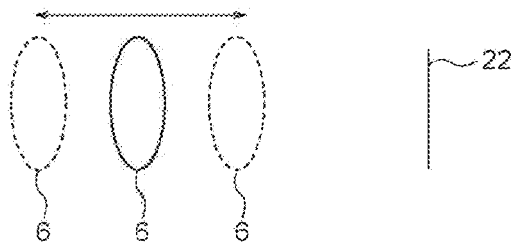
FIGS. 10A and 10B illustrate simplified diagrams depicting examples of a configuration of a correction unit 6 according to an embodiment of the present technology.
Figure 10B:
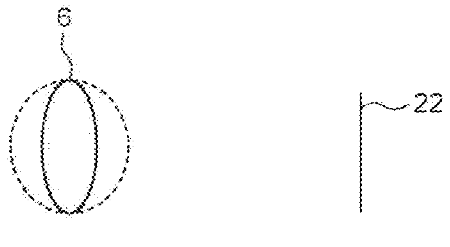

The correction unit 6 can be implemented, for example, by use of an element such as a lens that changes light refracting power, an element that reflects light, or the like. An example of a configuration of the correction unit 6 is described with reference to FIGS. 10A and 10B. FIGS. 10A and 10B illustrates simplified diagrams depicting examples of the configuration of the correction unit 6 according to an embodiment of the present technology.

In FIG. 10A, a mechanical zoom lens or the like is used as the correction unit 6. The mechanical zoom lens can correct the optical aberration by changing the distance from the scanning unit 22.

In FIG. 10B, a liquid crystal lens, a liquid lens, a deformable mirror, or the like is used as the correction unit 6. The liquid crystal lens, liquid lens, or deformable mirror can correct the optical aberration by changing its shape to change the focal distance.

Unless there is a particular technical contradiction, contents of the description given above of the image display device according to the third embodiment of the present technology can be applied to any other embodiment of the present technology.

4. Fourth Embodiment (Example 4 of Image Display Device)

Where a deflection portion is a diffraction grating, the deflection portion may diffract and reflect image light to a different direction depending upon the wavelength of the image light, thereby producing chromatic aberration. It is preferable that rays of light having different wavelengths enter the pupil in an arranged state.

Figure 11:
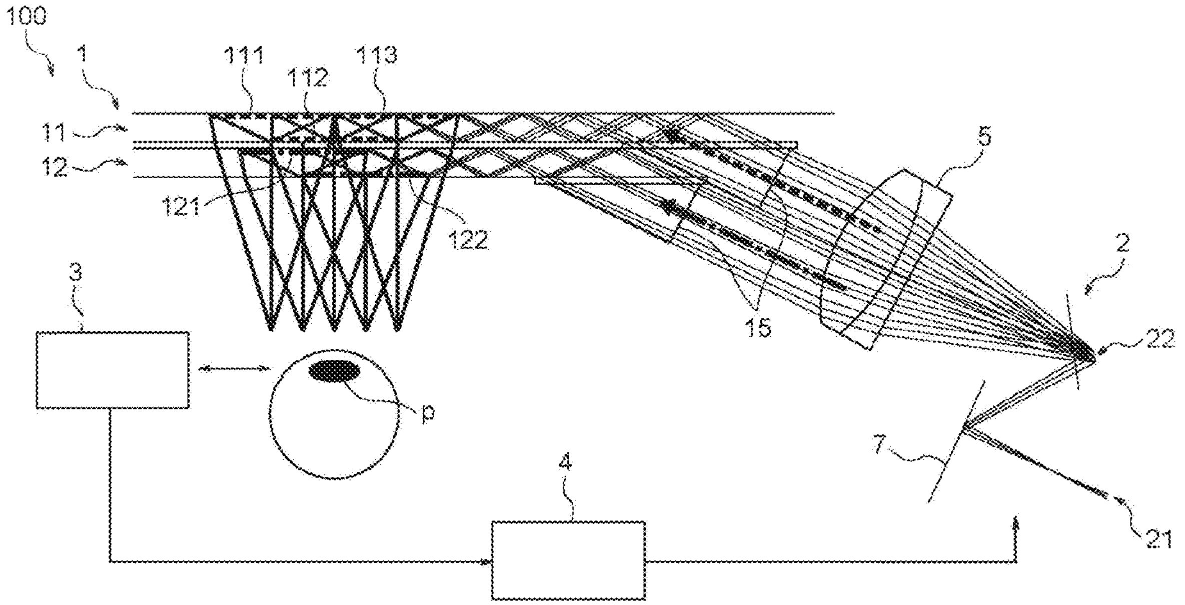
FIG. 11 is a block diagram depicting an example of a configuration of an image display device 100 according to an embodiment of the present technology.

Therefore, the image formation unit according to an embodiment of the present technology may include a chromatic aberration correction unit that corrects the chromatic aberration between focus points. This is described with reference to FIG. 11. FIG. 11 is a block diagram depicting an example of a configuration of the image display device 100 according to an embodiment of the present technology. As depicted in FIG. 11, the image formation unit 2 includes a chromatic aberration correction unit 7 that corrects the chromatic aberration between focus points. The chromatic aberration of image light emitted from the light source 21 is corrected by the chromatic aberration correction unit 7. The chromatic aberration correction unit 7 may be, for example, a diffraction grating or a holographic optical element.

The chromatic aberration correction unit 7 and the deflection portions 111, 112, 113, 121, and 122 have a conjugate relation with each other. The chromatic aberration caused by the chromatic aberration correction unit 7 is reduced by the deflection portions placed in front of the pupil. Consequently, an image of high picture quality can be provided to the user.

Unless there is a particular technical contradiction, contents of the description given above of the image display device according to the fourth embodiment of the present technology can be applied to any other embodiment of the present technology.

5. Fifth Embodiment (Example 5 of Image Display Device)

Figure 12:
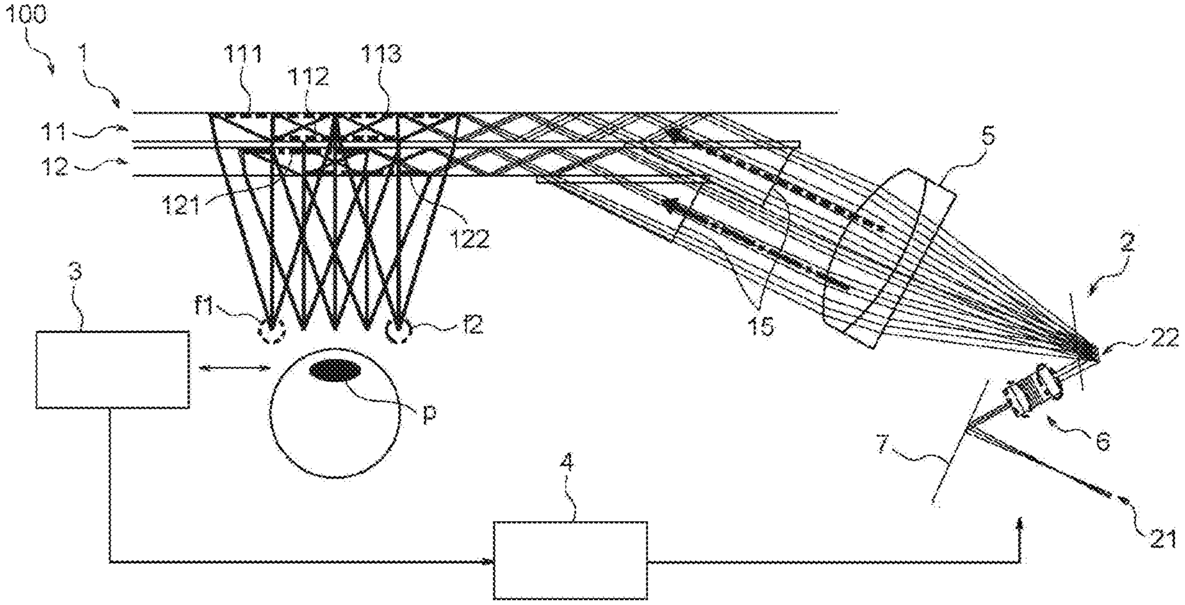
FIG. 12 is a block diagram depicting an example of a configuration of an image display device 100 according to an embodiment of the present technology.

The image formation unit may include a correction unit that corrects an intermediate image plane with respect to a deflection portion that forms a focus point, and a chromatic aberration correction unit that corrects chromatic aberration between focus points. This is described with reference to FIG. 12. FIG. 12 is a block diagram depicting an example of a configuration of the image display device 100 according to an embodiment of the present technology. As depicted in FIG. 12, the image formation unit 2 includes a correction unit 6 that corrects an intermediate image plane with respect to a deflection portion that forms a focus point, and a chromatic aberration correction unit 7 that corrects chromatic aberration between focus points. This makes it possible to provide an image of high picture quality to the user.

Unless there is a particular technical contradiction, contents of the description given above of the image display device according to the fifth embodiment of the present technology can be applied to any other embodiment of the present technology.

6. Sixth Embodiment (Example 6 of Image Display Device)

In the working examples described above, the scanning region the scanning unit 22 has corresponds to the paths the light guide plate 1 has, as depicted in FIGS. 6A, 6B and 6C. For example, where the light guide plate 1 has two paths, only a half region of the scanning region 221 is used at the same time while the remaining half region remains in an unused state. Further, if the entering portion of image light differs for each of multiple paths, the diameter of a ray of image light emitted from the scanning unit 22 becomes great. This gives rise to a problem that the size of the optical system becomes great.

Figure 13:
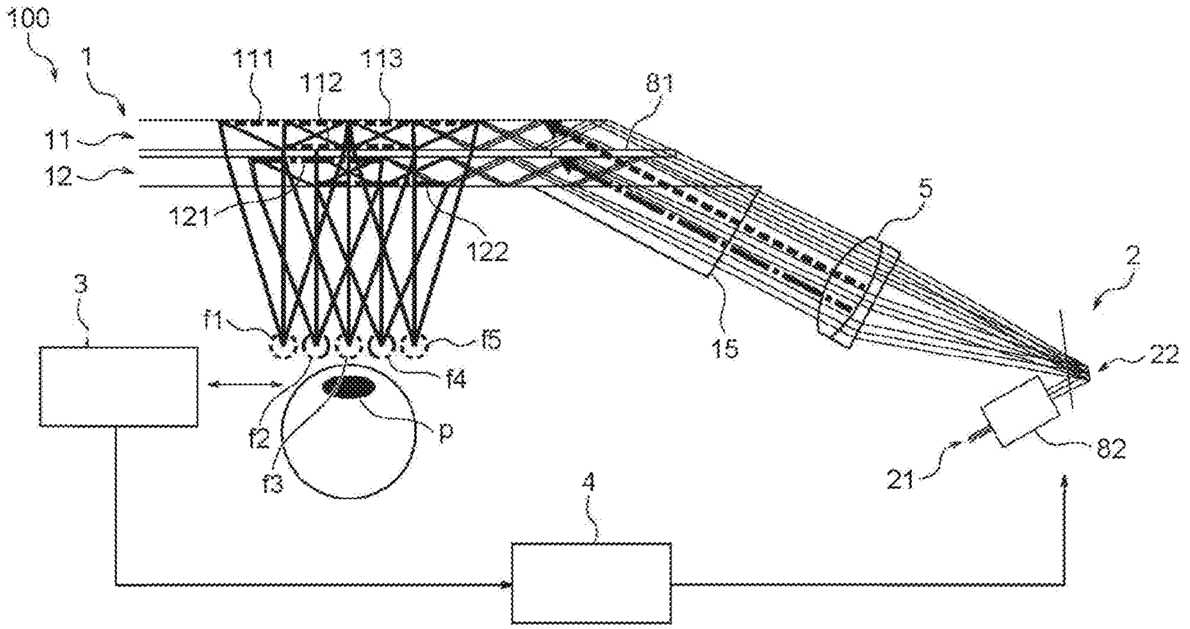
FIG. 13 is a block diagram depicting an example of a configuration of an image display device 100 according to an embodiment of the present technology.

Therefore, the light guide plate may include, at least at a portion thereof between the two paths, a polarized light switching portion that transmits or reflects image light entering therein, the image formation unit may include a switching controlling unit that performs switching between transmission and reflection to be performed by the polarized light switching portion, and the control unit may select transmission or reflection to be performed by the polarized light switching portion under the control of the switching controlling unit. This is described with reference to FIG. 13. FIG. 13 is a block diagram depicting an example of a configuration of the image display device 100 according to an embodiment of the present technology.

As depicted in FIG. 13, the light guide plate 1 includes, at least at a portion thereof between the two paths 11 and 12, a polarized light switching portion 81 that transmits or reflects image light entering therein.

The polarized light switching portion 81 may be a polarized light selection element such as, for example, a polarizing beam splitter. The polarized light switching portion 81 can separate light entering therein into S polarized light and P polarized light, for example, by reflecting the S polarized light while transmitting the P polarized light therethrough.

The image formation unit 2 includes a switching controlling unit 82 that performs switching between transmission and reflection to be performed by the polarized light switching portion 81. The control unit 4 selects transmission or reflection to be performed by the polarized light switching portion 81, under the control of the switching controlling unit 82. For example, when image light is to enter the first path 11, the control unit 4 controls the switching controlling unit 82 such that the polarized light switching portion 81 transmits image light therethrough.

This decreases the size of the scanning region the scanning unit 22 has and the size of the projection lens 5. Further, the entering portion 15 is used in common for the paths 11 and 12. As a result, scaling down of the image display device 100 becomes possible.

Unless there is a particular technical contradiction, contents of the description given above of the image display device according to the sixth embodiment of the present technology can be applied to any other embodiment of the present technology.

7. Seventh Embodiment (Example 7 of Image Display Device)

Figure 14:
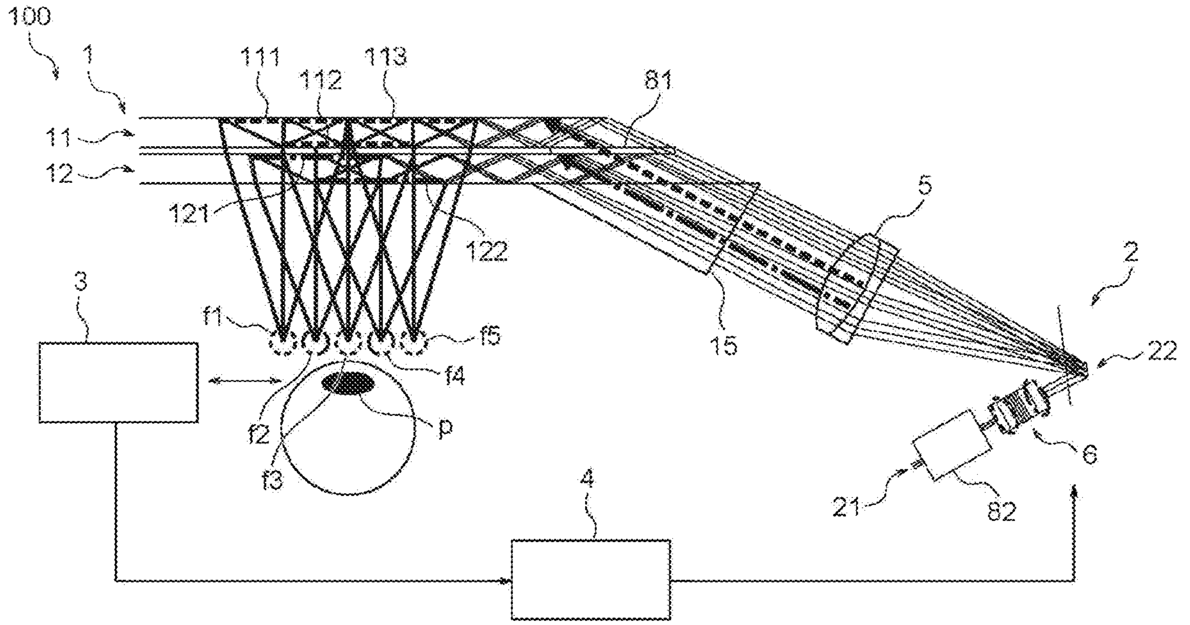
FIG. 14 is a block diagram depicting an example of a configuration of an image display device 100 according to an embodiment of the present technology.

The image display device according to an embodiment of the present technology is described with reference to FIG. 14. FIG. 14 is a block diagram depicting an example of a configuration of the image display device 100 according to an embodiment of the present technology. As depicted in FIG. 14, the light guide plate 1 includes, at least at a portion thereof between the two paths, a polarized light switching portion 81 that transmits or reflects the image light entering therein.

The image formation unit 2 includes a correction unit 6 that corrects an intermediate image plane with respect to a deflection portion that forms a focus point, and a switching controlling unit 82 that performs switching between transmission and reflection to be performed by the polarized light switching portion 81. The control unit 4 selects transmission or reflection to be performed by the polarized light switching portion 81, under the control of the switching controlling unit 82.

This makes it possible to achieve high picture quality of an image and scaling down of the device.

Unless there is a particular technical contradiction, contents of the description given above of the image display device according to the seventh embodiment of the present technology can be applied to any other embodiment of the present technology.

8. Eighth Embodiment (Example 8 of Image Display Device)

Figure 15:
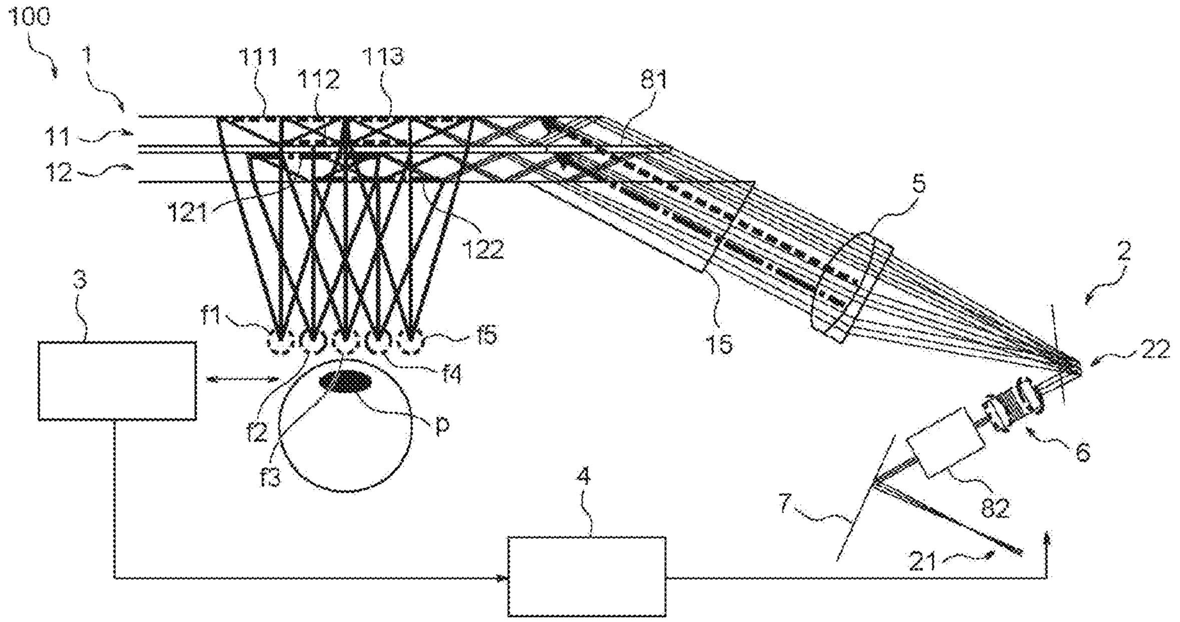
FIG. 15 is a block diagram depicting an example of a configuration of an image display device 100 according to an embodiment of the present technology.

The image display device according to an embodiment of the present technology is described with reference to FIG. 15. FIG. 15 is a block diagram depicting an example of a configuration of the image display device 100 according to an embodiment of the present technology. As depicted in FIG. 15, the light guide plate 1 includes, at least at a portion thereof between the two paths 11 and 12, a polarized light switching portion 81 that transmits or reflects image light entering therein.

The image formation unit 2 includes a correction unit 6 that corrects an intermediate image plane with respect to a deflection portion that forms a focus point, a chromatic aberration correction unit 7 that corrects chromatic aberration between focus points, and a switching controlling unit 82 that performs switching between transmission and reflection to be performed by the polarized light switching portion 81.

The control unit 4 selects transmission or reflection to be performed by the polarized light switching portion 81, under the control of the switching controlling unit 82.

This makes it possible to achieve high picture quality of an image and scaling down of the device.

Unless there is a particular technical contradiction, contents of the description given above of the image display device according to the eighth embodiment of the present technology can be applied to any other embodiment of the present technology.

9. Ninth Embodiment (Example 9 of Image Display Device)

Figure 16:
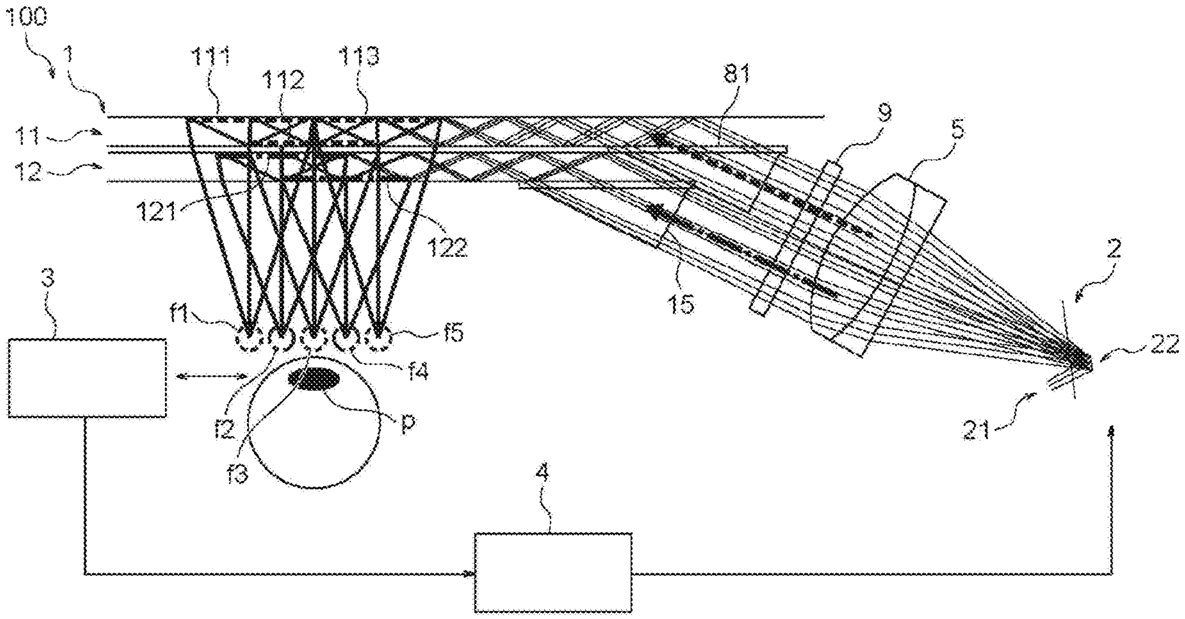
FIG. 16 is a block diagram depicting an example of a configuration of an image display device 100 according to an embodiment of the present technology.

The image display device according to an embodiment of the present technology is described with reference to FIG. 16. FIG. 16 is a block diagram depicting an example of a configuration of the image display device 100 according to an embodiment of the present technology. As depicted in FIG. 16, the image display device 100 includes a phase modulation unit 9 on an optical axis of image light emitted from the image formation unit 2. The phase modulation unit 9 may be arranged on the light guide plate 1 side with respect to the projection lens 5 or may be arranged on the image formation unit 2 side with respect to the projection lens 5.

The phase modulation unit 9 modulates the phase of image light. As an example of the phase modulation unit 9, a spatial light modulator (SLM) of the phase modulation type or the like can be used. This makes it possible for the image display device 100 to provide an image of high picture quality to the user.

Unless there is a particular technical contradiction, contents of the description given above of the image display device according to the ninth embodiment of the present technology can be applied to any other embodiment of the present technology.

10. Tenth Embodiment (Example 10 of Image Display Device)

Figure 17:
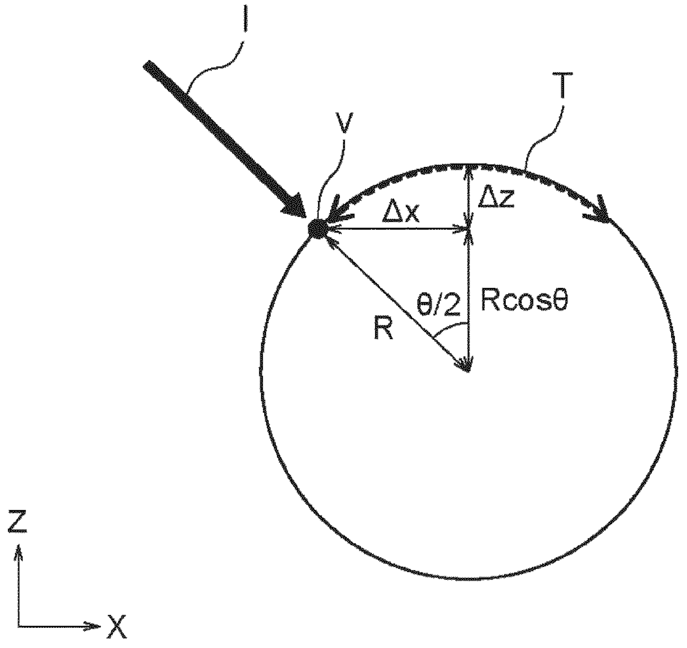
FIG. 17 is a simplified diagram depicting a movement of the pupil.

When the eyeball rotates, the pupil moves while drawing a miracle together with the rotation. This is described with reference to FIG. 17. FIG. 17 is a simplified diagram depicting a movement of the pupil. As depicted in FIG. 17, image light 1 enters the eyeball.

A vertex v of the cornea draws a trajectory T together with rotation of the eyeball. Here, the distance from the vertex v of the cornea to the center of the eyeball is represented by R. When the angle over which the eyeball rotates is $\theta/2$ that is one half of the angle $\theta$ of view, a moving distance $\Delta x$ of the vertex v of the cornea in the X-axis direction is obtained by calculation of $R \sin \theta$. A moving distance $\Delta z$ of the vertex v of the cornea in the Z-axis direction is obtained by calculation of $R(1-\sin \theta)$.

Figure 18:
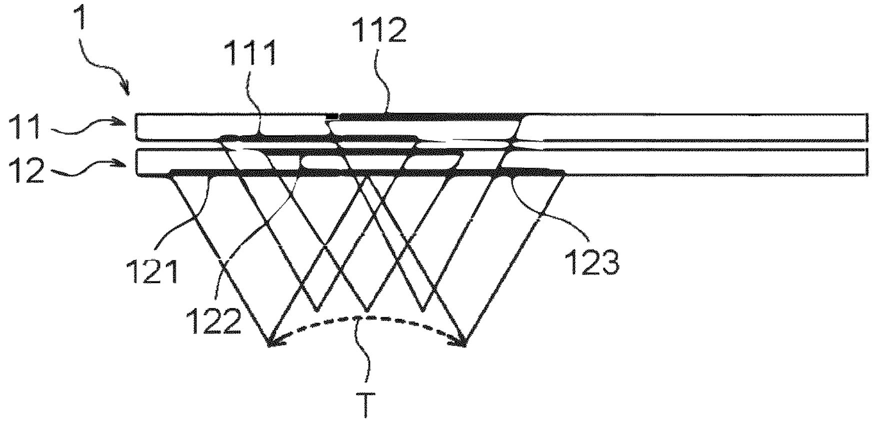
FIG. 18 is a simplified diagram depicting an example of a configuration of a light guide plate 1 according to an embodiment of the present technology.

The deflection portions can be arranged taking $\Delta x$ and $\Delta z$ into consideration. This is described with reference to FIG. 18. FIG. 18 is a simplified diagram depicting an example of a configuration of the light guide plate 1 according to an embodiment of the present technology. As depicted in FIG. 18, deflection portions 111, 112, 121, 122, and 123 are arranged such that they form focus points along a trajectory T drawn by the pupil together with the rotation of the eyeball. By this, the focus points are formed in a displaced relation from each other in the thicknesswise direction of the light guide plate 1. As a result, the image display device 100 can form focus points according to a characteristic of the eyeball and can provide an image of high picture quality to the user.

Unless there is a particular technical contradiction, contents of the description given above of the image display device according to the tenth embodiment of the present technology can be applied to any other embodiment of the present technology.

11. Eleventh Embodiment (Example 11 of Image Display Device)

Figure 19:
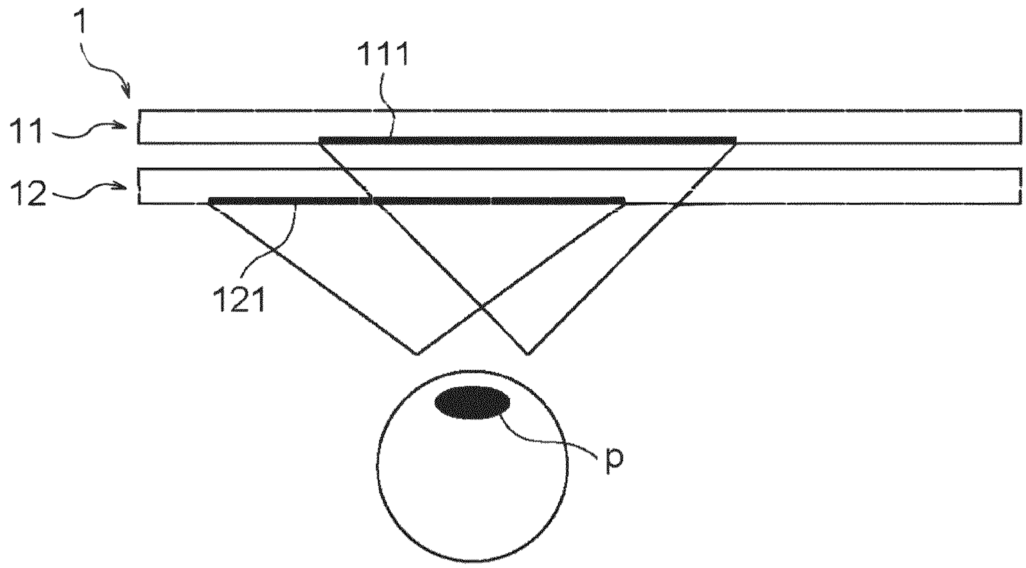
FIG. 19 is a simplified diagram depicting an example of a configuration of a light guide plate 1 according to an embodiment of the present technology.

The control unit may change the distance between a deflection portion and the pupil on the basis of position information of the pupil. This is described with reference to FIG. 19. FIG. 19 is a simplified diagram depicting an example of a configuration of the light guide plate 1 according to an embodiment of the present technology. As depicted in FIG. 19, the distance between the deflection portion 111 and the pupil exhibits a change. The control unit 4 can change the distance between the deflection portion and the pupil (eye relief) on the basis of position information of the pupil detected by the detection unit 3. This makes it possible for the image display device 100 to provide an image of high picture quality to the user.

Unless there is a particular technical contradiction, contents of the description given above of the image display device according to the eleventh embodiment of the present technology can be applied to any other embodiment of the present technology.

12. Twelfth Embodiment (Example 12 of Image Display Device)

It is said that the diameter of the pupil sometimes increases to approximately 6 to 7 mm. At this time, in a case where the light guide plate has such two paths as in other working examples, even if the distance between focus points is 4 mm, two focus points are sometimes formed at the pupil.

Figure 20:
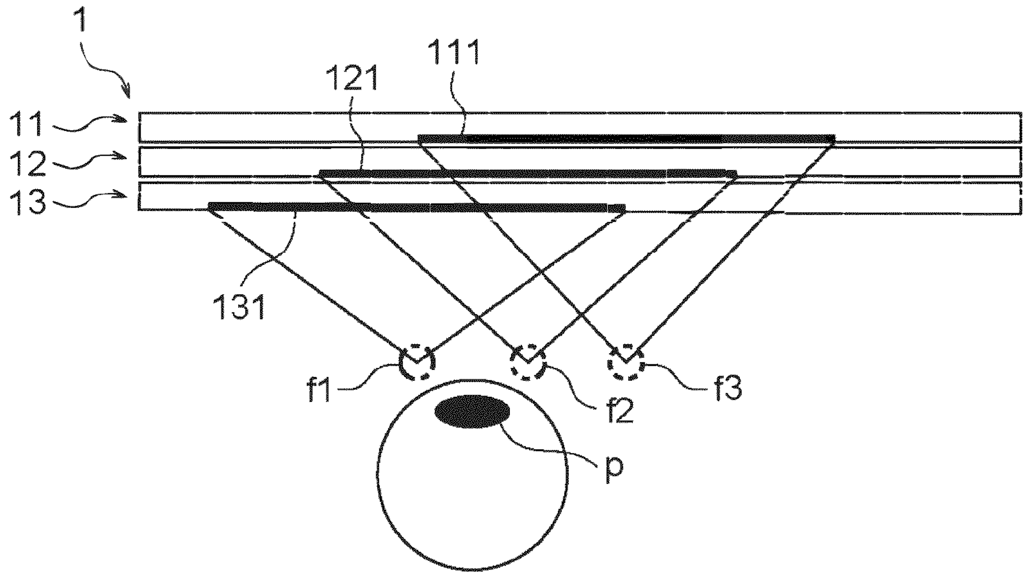
FIG. 20 is a simplified diagram depicting an example of a configuration of a light guide plate 1 according to an embodiment of the present technology.

Therefore, the number of paths the light guide plate has may be three or more. This is described with reference to FIG. 20. FIG. 20 is a simplified diagram depicting an example of a configuration of the light guide plate 1 according to an embodiment of the present technology. As depicted in FIG. 20, the light guide plate 1 has at least three paths 11, 12, and 13 that perform internal total reflection and guidance of image light entering therein.

For example, by setting the distance between the focus point f1 and the focus point f2 to 4 mm and setting the distance between the focus point f2 and the focus point f3 to 4 mm, then the distance between the focus point f1 and the focus point f3 can be set to 8 mm. This makes it possible to prevent two focus points from being formed at the pupil.

Unless there is a particular technical contradiction, contents of the description given above of the image display device according to the twelfth embodiment of the present technology can be applied to any other embodiment of the present technology.

13. Thirteenth Embodiment (Example of Optical Guide Plate)

The light guide plate according to an embodiment of the present technology has at least two paths that perform internal total reflection of image light entering therein and emit resulting image light to the pupil of an observer, each of the paths has at least one deflection portion that forms a focus point at the pupil, and each deflection portion is selected on the basis of position information of the pupil.

The light guide plate according to an embodiment of the present technology is described with reference to FIG. 5 again. As depicted in FIG. 5, the light guide plate 1 according to an embodiment of the present technology has at least two paths 11 and 12 that perform internal total reflection of image light entering therein and emit resulting image light to the pupil of an observer. Each of the paths 11 and 12 has at least one deflection portion that forms a focus point at the pupil p.

The deflection portion 111 the first path 11 has forms a focus point f1. The deflection portion 112 the first path 11 has forms a focus point f3. The deflection portion 113 the first path 11 has forms a focus point f5.

The deflection portion 121 the second path 12 has forms a focus point f2. The deflection portion 122 the second path 12 has forms a focus point f4.

Each deflection portion is selected on the basis of position information of the pupil p. This makes it possible to prevent multiple focus points from being projected to the pupil at the same time.

Unless there is a particular technical contradiction, contents of the description given above of the light guide plate according to the thirteenth embodiment of the present technology can be applied to any other embodiment of the present technology.

14. Fourteenth Embodiment (Example of Image Display Method)

An image display method according to an embodiment of the present technology includes detecting the position of the pupil of an observer, selecting at least one of at least two paths that perform internal total reflection and guidance of image light to be emitted to the pupil, on the basis of position information of the pupil, and condensing to the pupil the image light emitted from the selected path.

Figure 21:
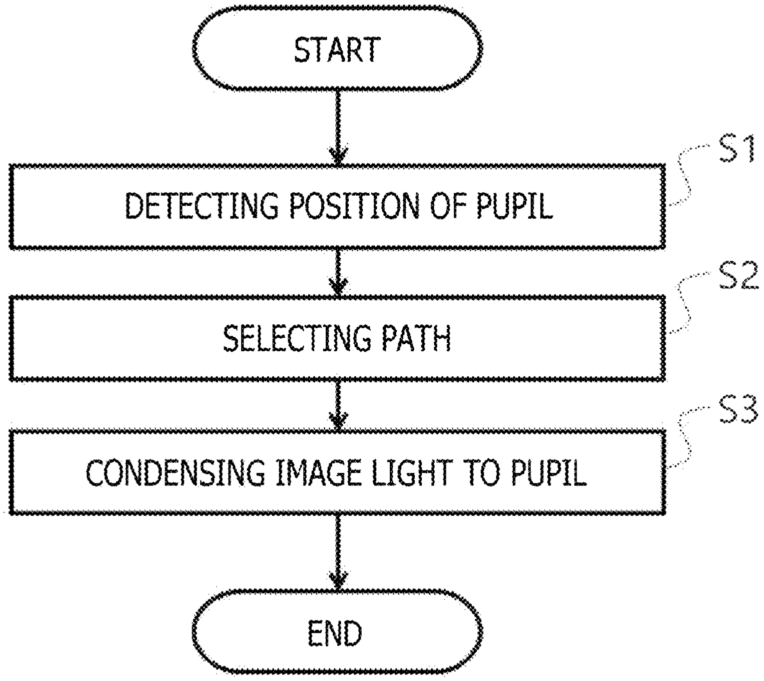
FIG. 21 is a flow chart depicting an example of an image display method according to an embodiment of the present technology.

The image display method according to an embodiment of the present technology is described with reference to FIG. 21. FIG. 21 is a flow chart depicting an example of the image display method according to the embodiment of the present technology. As depicted in FIG. 21, the image display method according to the embodiment of the present technology includes detecting the position of the pupil of an observer (step S1), selecting at least one of at least two paths that perform internal total reflection and guidance of image light to be emitted to the pupil, on the basis of position information of the pupil (step S2), and condensing to the pupil the image light emitted from the selected path (step S3).

Unless there is a particular technical contradiction, contents of the description given above of the image display method according to the fourteenth embodiment of the present technology can be applied to any other embodiment of the present technology.

It is to be noted that the embodiment according to the present technology is not restricted to the embodiments described hereinabove and can be altered in various manners without departing from the subject matter or the present technology.

Moreover, the present technology can also adopt the following configurations.

[1]

An image display device including:

an image formation unit;

a light guide plate that emits image light entering from the image formation unit, to a pupil of an observer;

a detection unit that detects a position of the pupil; and a control unit that controls the image formation unit, in which the light guide plate has at least two paths that perform internal total reflection and guidance of the image light entering therein, each of the paths includes at least one deflection portion that forms a focus point at the pupil, and the control unit makes a selection from the deflection portions on the basis of position information of the pupil.

[2]

The image display device according to [1], in which the image formation unit includes a light source, and a scanning unit that performs scanning with light entering from the light source, and the scanning unit has a scanning region corresponding to the paths.

[3]

The image display device according to [1] or [2], in which the deflection portion includes a blue light deflection portion that forms a focus point of blue light, a green light deflection portion that forms a focus point of green light, and a red light deflection portion that forms a focus point of red light, and a distance between the deflection portion and the pupil is adjusted such that each of the blue light deflection portion, the green light deflection portion, and the red light deflection portion does not emit light of any other color to the pupil.

[4]

The image display device according to any one of [1] to [3], in which the deflection portion includes a blue light deflection portion that forms a focus point of blue light, a green light deflection portion that forms a focus point of green light, and a red light deflection portion that forms a focus point of red light, and a distance between the focus points is adjusted such that each of the blue light deflection portion, the green light deflection portion, and the red light deflection portion does not emit light of any other color to the pupil.

[5]

The image display device according to any one of [1] to [4], in which the deflection portion includes a blue light deflection portion that forms a focus point of blue light, a green light deflection portion that forms a focus point of green light, and a red light deflection portion that forms a focus point of red light, and a diffraction characteristic of the deflection portion is adjusted such that each of the blue light deflection portion, the green light deflection portion, and the red light deflection portion does not emit light of any other color to the pupil.

[6]

The image display device according to any one of [1] to [5], in which the image formation unit includes a correction unit that corrects an intermediate image plane with respect to the deflection portion that forms the focus point.

[7]

The image display device according to [6], in which the correction unit includes a zoom lens, a liquid crystal lens, a liquid lens, or a deformable mirror.

[8]

The image display device according to any one of [1] to [7], in which the image formation unit includes a chromatic aberration correction unit that corrects chromatic aberration between the focus points.

[9]

The image display device according to [8], in which the chromatic aberration correction unit includes a diffraction grating or a holographic optical element.

[10]

The image display device according to any one of [1] to [9], in which the light guide plate includes, at least at a portion thereof between the two paths, a polarized light switching portion that transmits or reflects the image light entering therein, the image formation unit includes a switching controlling unit that performs switching between transmission and reflection to be performed by the polarized light switching portion, and the control unit selects transmission or reflection to be performed by the polarized light switching portion, under control of the switching controlling unit.

[11]

The image display device according to [10], in which the polarized light switching portion includes a polarizing beam splitter.

[12]

The image display device according to any one of [1] to [11], in which the light guide plate includes, at least at a portion thereof between the two paths, a polarized light switching portion that transmits or reflects the image light entering therein, the image formation unit includes a correction unit that corrects an intermediate image plane with respect to the deflection portion that forms the focus point focus point, a chromatic aberration correction unit that corrects chromatic aberration between the focus points, and a switching controlling unit that performs switching between transmission and reflection to be performed by the polarized light switching portion, and the control unit selects transmission or reflection to be performed by the polarized light switching portion, under control of the switching controlling unit.

[13]

The image display device according to any one of [1] to [12], in which the light guide plate includes, at least at a portion thereof between the two paths, a polarized light switching portion that transmits or reflects the image light entering therein, the image formation unit includes a correction unit that corrects an intermediate image plane with respect to the deflection portion that forms the focus point, and a switching controlling unit that performs switching between transmission and reflection to be performed by the polarized light switching portion, and the control unit selects transmission or reflection to be performed by the polarized light switching portion, under control of the switching controlling unit.

[14]

The image display device according to any one of [1] to [13], further including:

a phase modulation unit provided on an optical axis of image light emitted from the image formation unit.

[15]

The image display device according to any one of [1] to [14], in which the deflection portion is arranged so as to form a focus point along a trajectory drawn by the pupil together with rotation of an eyeball.

[16]

The image display device according to any one of [1] to [15], in which the control unit changes a distance between the deflection portion and the pupil on the basis of the position information of the pupil.

[17]

The image display device according to any one of [1] to [16], in which the light guide plate has at least three paths that perform internal total reflection and guidance of the image light entering therein.

[18]

The image display device according to any one of [1] to [17], in which a smallest distance between the focus points is 2 mm.

[19]

A light guide plate having:

at least two paths that perform internal total reflection of image light entering therein and emit the resultant light to a pupil of an observer, in which each of the paths has at least one deflection portion that forms a focus point at the pupil, and each of the deflection portions is selected on the basis of position information of the pupil.

[20]

An image display method including:

detecting a position of a pupil of an observer;

selecting, on the basis of position information of the pupil, at least one of at least two paths that perform internal total reflection and guidance of image light to be emitted to the pupil; and condensing to the pupil the image light emitted from the selected one of the paths.

REFERENCE SIGNS LIST

100: Image display device
1: Light guide plate
11, 12: Path
111, 112, 113, 121, 122: Deflection portion
15: Entering portion
2: Image formation unit
21: Light source
22: Scanning unit
221: Scanning region
3: Detection unit
4: Control unit
5: Projection lens
6: Correction unit
7: Chromatic aberration correction unit
81: Polarized light switching portion
82: Switching controlling unit
9: Phase modulation unit
f1 to f5: Focus point
S1: Detecting position of pupil of observer
S2: Selecting at least one of at least two paths
S3: Condensing image light to pupil

What is claimed is:

1. An image display device, comprising:
an image formation unit;
a light guide plate that emits image light entering from the image formation unit, to a pupil of an observer;
a detection unit that detects a position of the pupil; and
a control unit that controls the image formation unit, wherein
the light guide plate has at least two paths that perform internal total reflection and guidance of the image light entering therein,
each of the paths includes at least one deflection portion that forms a focus point at the pupil, and
the control unit makes a selection from the deflection portions on a basis of position information of the pupil,
wherein—the image formation unit includes
a light source, and
a scanning unit that performs scanning with light entering from the light source, and
wherein the scanning unit has a scanning region corresponding to the paths.

2. An image display device, comprising:
an image formation unit;
a light guide plate that emits image light entering from the image formation unit, to a pupil of an observer;
a detection unit that detects a position of the pupil; and
a control unit that controls the image formation unit, wherein
the light guide plate has at least two paths that perform internal total reflection and guidance of the image light entering therein,
each of the paths includes at least one deflection portion that forms a focus point at the pupil, and
the control unit makes a selection from the deflection portions on a basis of position information of the pupil,
wherein—the deflection portion includes
a blue light deflection portion that forms a focus point of blue light,
a green light deflection portion that forms a focus point of green light, and
a red light deflection portion that forms a focus point of red light, and
wherein a distance between the deflection portion and the pupil is adjusted such that each of the blue light deflection portion, the green light deflection portion, and the red light deflection portion does not emit light of any other color to the pupil.

3. An image display device, comprising:
an image formation unit;
a light guide plate that emits image light entering from the image formation unit, to a pupil of an observer;
a detection unit that detects a position of the pupil; and
a control unit that controls the image formation unit, wherein
the light guide plate has at least two paths that perform internal total reflection and guidance of the image light entering therein,
each of the paths includes at least one deflection portion that forms a focus point at the pupil, and
the control unit makes a selection from the deflection portions on a basis of position information of the pupil,
wherein—the deflection portion includes
a blue light deflection portion that forms a focus point of blue light, a green light deflection portion that forms a focus point of green light, and a red light deflection portion that forms a focus point of red light, and wherein a distance between the focus points is adjusted such that each of the blue light deflection portion, the green light deflection portion, and the red light deflection portion does not emit light of any other color to the pupil.

4. An image display device, comprising:

an image formation unit;

a light guide plate that emits image light entering from the image formation unit, to a pupil of an observer;

a detection unit that detects a position of the pupil; and a control unit that controls the image formation unit, wherein the light guide plate has at least two paths that perform internal total reflection and guidance of the image light entering therein, each of the paths includes at least one deflection portion that forms a focus point at the pupil, and the control unit makes a selection from the deflection portions on a basis of position information of the pupil, wherein—the deflection portion includes a blue light deflection portion that forms a focus point of blue light, a green light deflection portion that forms a focus point of green light, and a red light deflection portion that forms a focus point of red light, and wherein a diffraction characteristic of the deflection portion is adjusted such that each of the blue light deflection portion, the green light deflection portion, and the red light deflection portion does not emit light of any other color to the pupil.

5. An image display device, comprising:

an image formation unit;

a light guide plate that emits image light entering from the image formation unit, to a pupil of an observer;

a detection unit that detects a position of the pupil; and a control unit that controls the image formation unit, wherein the light guide plate has at least two paths that perform internal total reflection and guidance of the image light entering therein, each of the paths includes at least one deflection portion that forms a focus point at the pupil, and the control unit makes a selection from the deflection portions on a basis of position information of the pupil, wherein—the image formation unit includes a correction unit that corrects an intermediate image plane with respect to the deflection portion that forms the focus point.

6. The image display device according to claim 5, wherein the correction unit includes a zoom lens, a liquid crystal lens, a liquid lens, or a deformable mirror.

7. The image display device according to claim 1, wherein the image formation unit includes a chromatic aberration correction unit that corrects chromatic aberration between the focus points.

8. The image display device according to claim 7, wherein the chromatic aberration correction unit includes a diffraction grating or a holographic optical element.

9. The image display device according to claim 1, wherein the light guide plate includes, at least at a portion thereof between the two paths, a polarized light switching portion that transmits or reflects the image light entering therein, the image formation unit includes a switching controlling unit that performs switching between transmission and reflection to be performed by the polarized light switching portion, and the control unit selects transmission or reflection to be performed by the polarized light switching portion, under control of the switching controlling unit.

10. The image display device according to claim 9, wherein the polarized light switching portion includes a polarizing beam splitter.

11. An image display device, comprising:

an image formation unit;

a light guide plate that emits image light entering from the image formation unit, to a pupil of an observer;

a detection unit that detects a position of the pupil; and a control unit that controls the image formation unit, wherein the light guide plate has at least two paths that perform internal total reflection and guidance of the image light entering therein, each of the paths includes at least one deflection portion that forms a focus point at the pupil, and the control unit makes a selection from the deflection portions on a basis of position information of the pupil, wherein—the light guide plate includes, at least at a portion thereof between the two paths, a polarized light switching portion that transmits or reflects the image light entering therein, wherein the image formation unit includes a correction unit that corrects an intermediate image plane with respect to the deflection portion that forms the focus point, a chromatic aberration correction unit that corrects chromatic aberration between the focus points, and a switching controlling unit that performs switching between transmission and reflection to be performed by the polarized light switching portion, and wherein the control unit selects transmission or reflection to be performed by the polarized light switching portion, under control of the switching controlling unit.

12. An image display device, comprising:

an image formation unit;

a light guide plate that emits image light entering from the image formation unit, to a pupil of an observer;

a detection unit that detects a position of the pupil; and a control unit that controls the image formation unit, wherein the light guide plate has at least two paths that perform internal total reflection and guidance of the image light entering therein, each of the paths includes at least one deflection portion that forms a focus point at the pupil, and the control unit makes a selection from the deflection portions on a basis of position information of the pupil, wherein—the light guide plate includes, at least at a portion thereof between the two paths, a polarized light switching portion that transmits or reflects the image light entering therein, wherein the image formation unit includes a correction unit that corrects an intermediate image plane with respect to the deflection portion that forms the focus point, and a switching controlling unit that performs switching between transmission and reflection to be performed by the polarized light switching portion, and wherein the control unit selects transmission or reflection to be performed by the polarized light switching portion, under control of the switching controlling unit.

13. The image display device according to claim 1, further comprising:

a phase modulation unit provided on an optical axis of image light emitted from the image formation unit.

14. The image display device according to claim 1, wherein the deflection portion is arranged so as to form a focus point along a trajectory drawn by the pupil together with rotation of an eyeball.

15. The image display device according to claim 1, wherein the control unit changes a distance between the deflection portion and the pupil on the basis of the position information of the pupil.

16. The image display device according to claim 1, wherein the light guide plate has at least three paths that perform internal total reflection and guidance of the image light entering therein.

17. The image display device according to claim 1, wherein a smallest distance between the focus points is 2 mm.

18. The image display device according to claim 1, wherein the deflection portion includes a blue light deflection portion that forms a focus point of blue light, a green light deflection portion that forms a focus point of green light, and a red light deflection portion that forms a focus point of red light, and wherein a distance between the deflection portion and the pupil is adjusted such that each of the blue light deflection portion, the green light deflection portion, and the red light deflection portion does not emit light of any other color to the pupil.

19. The image display device according to claim 1, wherein the deflection portion includes a blue light deflection portion that forms a focus point of blue light, a green light deflection portion that forms a focus point of green light, and a red light deflection portion that forms a focus point of red light, and wherein a distance between the focus points is adjusted such that each of the blue light deflection portion, the green light deflection portion, and the red light deflection portion does not emit light of any other color to the pupil.

20. The image display device according to claim 1, wherein the deflection portion includes a blue light deflection portion that forms a focus point of blue light, a green light deflection portion that forms a focus point of green light, and a red light deflection portion that forms a focus point of red light, and wherein a diffraction characteristic of the deflection portion is adjusted such that each of the blue light deflection portion, the green light deflection portion, and the red light deflection portion does not emit light of any other color to the pupil.

* * * * *